United States Patent [19]

Kinnison

[11] 3,899,703
[45] Aug. 12, 1975

[54] PERMANENT MAGNET MOTION CONVERSION MEANS

[76] Inventor: Robert W. Kinnison, 1611 E. Lincoln St., Fort Collins, Colo. 80521

[22] Filed: May 10, 1974

[21] Appl. No.: 468,978

[52] U.S. Cl. .................... 310/103; 310/23; 310/46
[51] Int. Cl.² ...................................... H02K 49/10
[58] Field of Search ........ 310/23, 24, 46, 103, 159, 310/156, 80

[56] References Cited
UNITED STATES PATENTS
3,609,425  9/1971  Sheridan ............................ 310/103

Primary Examiner—Donovan F. Duggan
Attorney, Agent, or Firm—Watson, Cole, Grindle & Watson

[57] ABSTRACT

A magnetic motor having at least one drive unit including first and second stationary magnets arranged with inverse directions of polarity and a movable magnet mounted for movement within the magnetic fields of the first and second stationary magnets. A diverter device is switched between two positions for alternately diverting the magnetic fields of the first and second stationary magnets. The movable magnet is alternately switched into alignment with the first and second stationary magnets, while the diverter diverts the magnetic field from the other magnet. In this manner a repulsion force is created which causes the continued movement of the movable magnet.

7 Claims, 9 Drawing Figures

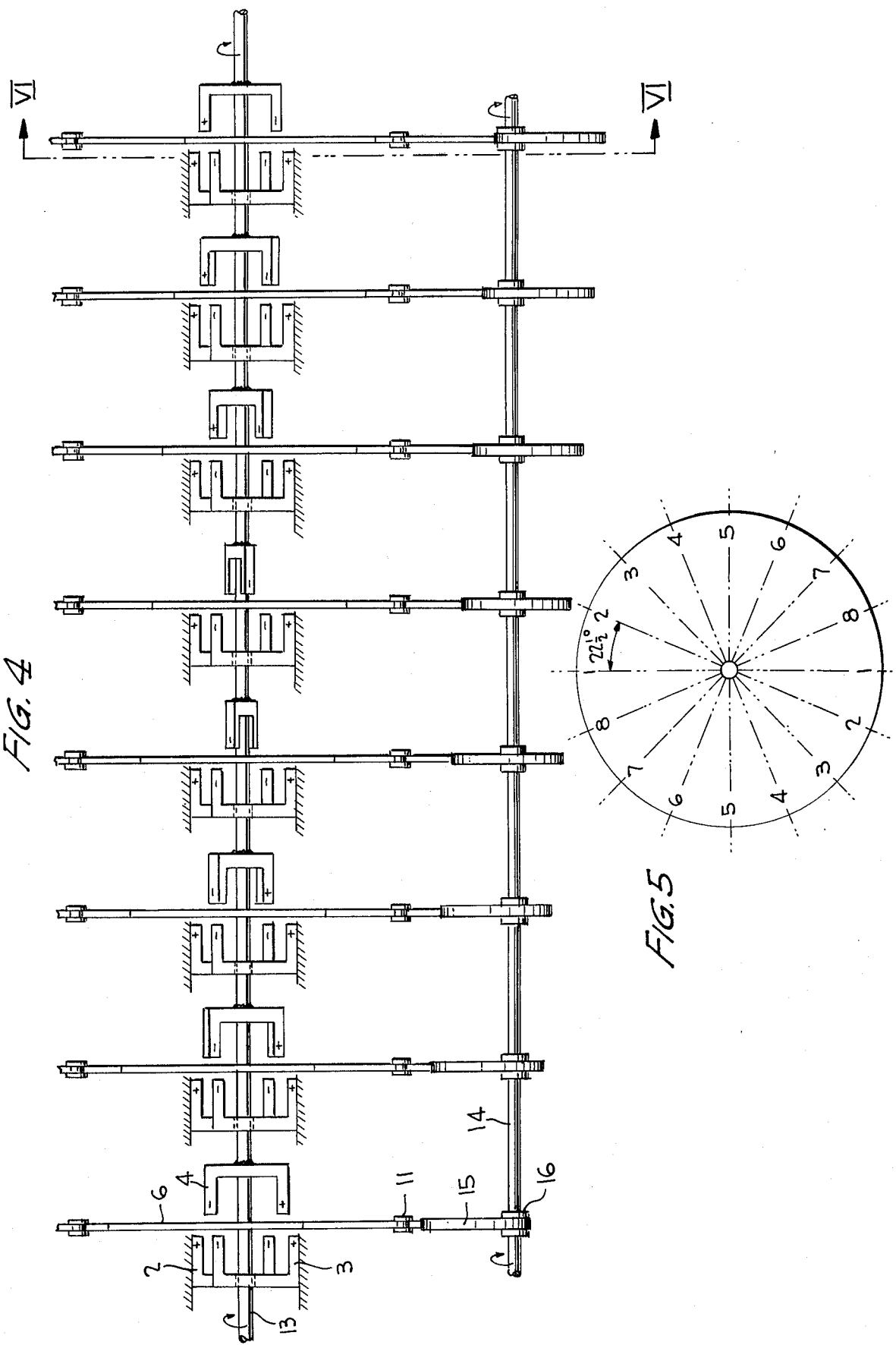

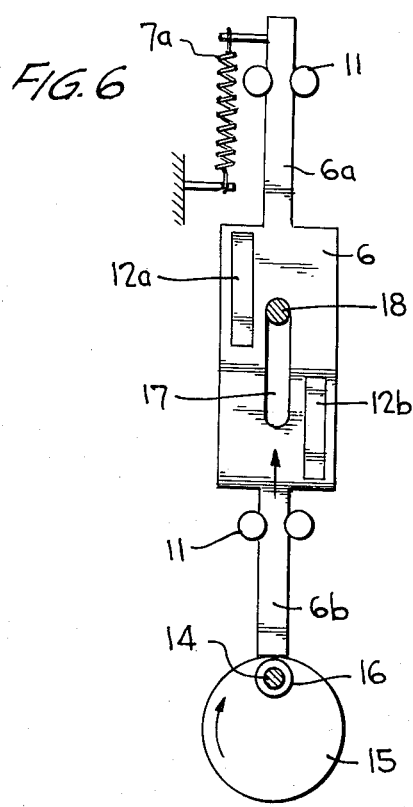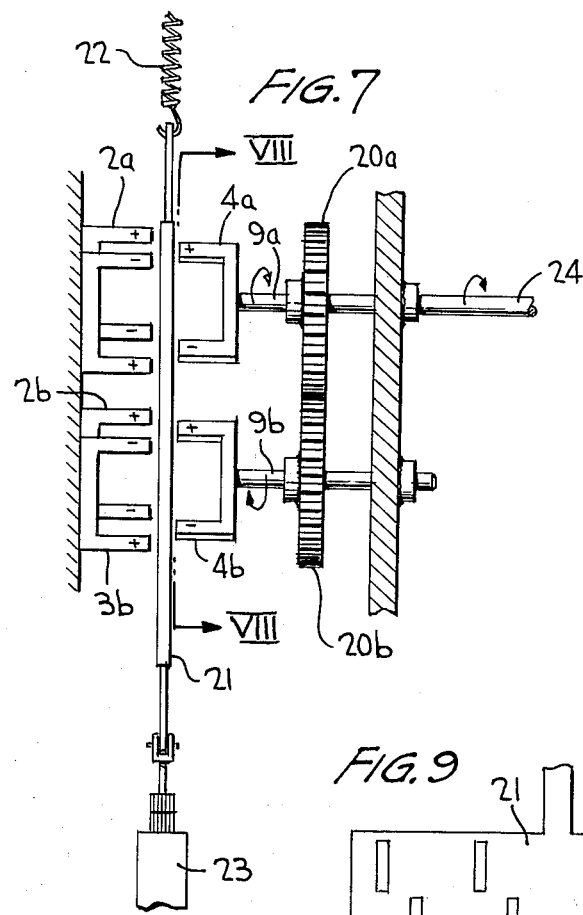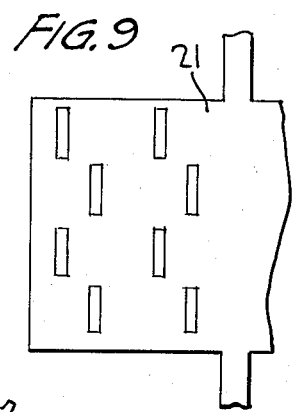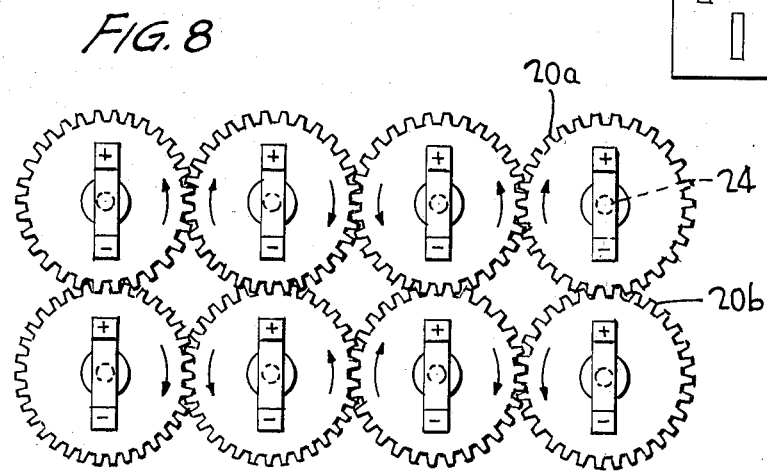

PERMANENT MAGNET MOTION CONVERSION MEANS

BACKGROUND OF THE INVENTION

The present invention relates to a magnetic motor in which both the movable and the stationary members are constructed from permanent magnets.

Due to the lack of available sources of standard types of fuel and to the concerns for protecting the environment, alternative sources for supplying energy for the driving of power systems becomes highly advantageous. One type of power system which eliminates the need for fuel and also eliminates the ecological drawbacks of fuel consumption, is a system which utilizes magnetic motors. With the increasing problems of available sources of fuel and dangers to the environment, the interest in the utilization of such motors has recently significantly increased. Accordingly, many attempts are presently being made to provide magnetic motors which can be economically and efficiently operated for providing power.

Several types of magnetic motors are known in which a rotating set of magnets are influenced by attractive and repulsive forces which are created by a set of stationary magnets. In one such device, as shown in U.S. Pat. No. 3,703,653, to Robert D. Tracy et al, a set of magnets mounted for rotation about an axis are first attracted towards the corresponding stationary magnets. After the rotatable magnets are aligned with the stationary magnets, the magnetic fields of the stationary magnets are then altered so as to provide a repulsion force with respect to the rotatable magnets thereby causing the continued rotation of the rotatable magnets. In order to accomplish this effective inversion of the polarity of the stationary magnets, so as to alternately provide the attractive and repulsive forces, the stationary magnets are initially covered by magnetic plates as the rotatable magnets are approaching the position of the stationary magnets. These magnetic plates in effect cause the stationary magnets to provide an attractive force to the rotatable magnets. When the rotatable magnets are then in alignment with the stationary magnets, these magnetic plates are removed and the stationary magnets then provide a repulsion force to the rotatable magnets and thereby cause the continued movement of the rotatable magnets. With this type of system, it is necessary that in addition to the stationary and rotatable magnets that the magnetic plates which are provided also be of a magnetic material.

SUMMARY OF THE INVENTION

An object of the present invention is to provide a magnetic motor which can be both efficiently and economically operated for providing power.

Another object of the present invention is to provide a magnetic motor which operates purely on the creation of repulsion forces between a set of stationary magnets and a corresponding movable magnet.

In accordance with the present invention, these objectives are achieved by providing a magnetic motor in which a movable magnet is alternately effected by a repulsion force created by either a first or second stationary magnet. The first and second stationary magnets are arranged with inverse directions of polarity and the movable magnet is mounted so as to move within the magnetic fields of the first and second stationary magnets. A diverter device alternately diverts the magnetic field of one of the stationary magnets so that only the other stationary magnet, which at that time has its direction of polarity in opposition to the polarity of the movable magnet, is capable of influencing the movable magnet by the creation of a repulsion force between the magnets. This repulsion force in turn causes the movement of the movable magnet.

In the preferred embodiment of the present invention, the stationary magnets and the movable magnets are all constructed of horseshoe-shaped magnets. The first and second stationary magnets are adjacently arranged and laterally offset with respect to one another. The movable magnet is mounted for rotation about an axial member so as to enable its direction of polarity to be inversed due to the rotation of the movable magnet. Accordingly, when the magnetic field of the movable magnet is orientated in the same direction as the magnetic field of one of the stationary magnets, the diverter device diverts the magnetic field of the other stationary magnet such that only the magnetic field of the stationary magnet having the same direction of polarity as the magnetic field of the movable magnet influences the movable magnet. Due to the identity in the direction of magnetic fields between the magnets, a repulsion force is created between the magnets which in turn causes the movable magnet to rotate about its axial member.

BRIEF DESCRIPTION OF THE DRAWINGS

FIG. 4 is a side perspective view of a second embodiment of a magnetic motor having a plurality of drive units, which are similar to the type of unit shown in FIG. 1.

FIG. 5 illustrates the angular relationship between the movable members shown in FIG. 4.

FIG. 6 is a front elevational view taken along lines VI—VI in FIG. 4 and showing one of the diverter members shown in FIG. 4.

FIG. 7 is a side elevation of a portion of a third embodiment of a magnetic motor having a plurality of drive units of the type shown in FIG. 1.

FIG. 8 is a front elevational view taken along lines VIII—VIII in FIG. 7 and showing the interconnection of a plurality of the drive units shown in FIG. 7.

FIG. 9 is a front elevational view of a portion of a diverter member for use with the magnetic motor illustrated in FIGS. 7 and 8.

DETAILED DESCRIPTION OF THE PREFERRED EMBODIMENTS

Figure 1:
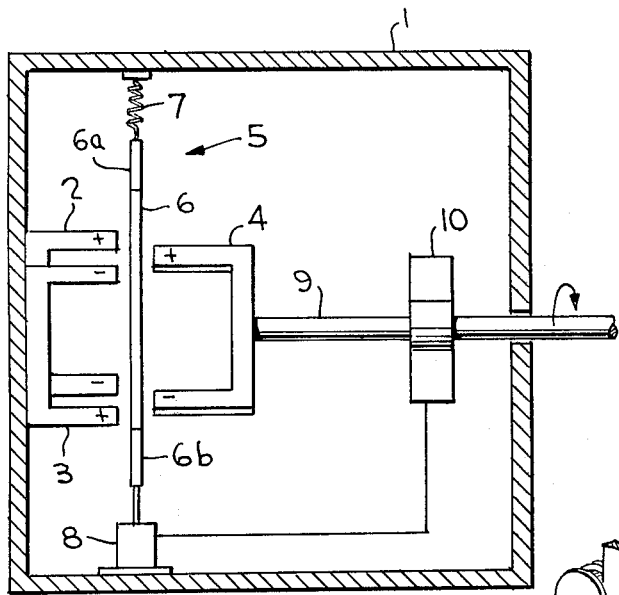
FIG. 1 is a partly sectional view of a drive unit of a first embodiment of a magnetic motor in accordance with the present invention.

A magnetic motor having a power drive unit, as shown in FIG. 1, has two stationary magnets 2 and 3 mounted within a housing 1 and a movable magnet 4 mounted for movement within the magnetic fields of the stationary magnets. The stationary magnets 2 and 3, which are both horseshoe-shaped magnets, are arranged with opposite directions of polarities. These stationary magnets are positioned adjacent to one another but laterally offset such that the north pole of magnet 2 is positioned higher than the adjacent south pole of magnet 3, such as shown in FIG. 2.

The movable magnet 4, which is also a horseshoe-shaped magnet, is mounted on the axial member 9 which is in turn mounted within the housing 1 so as to be capable of being rotated. As the movable magnet 4 rotates, it passes through the magnetic fields of the stationary magnets 2 and 3. A diverter plate member 6, having two diverter bars 12a and 12b, alternately diverts the magnetic fields from one of the stationary magnets such that only the other stationary magnet influences the movable magnet. The diverter plate member is movable between the set of bearings 11.

Figure 2:
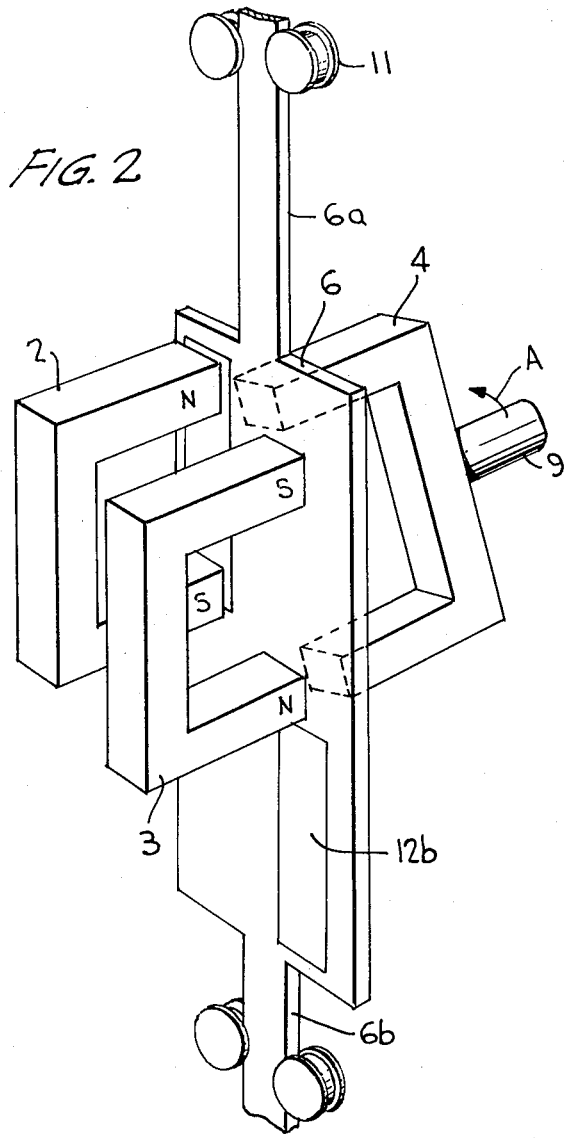
FIG. 2 is a perspective view of the magnetic members and the diverter member shown in FIG. 1, with the diverter member being in a first position.
Figure 3:
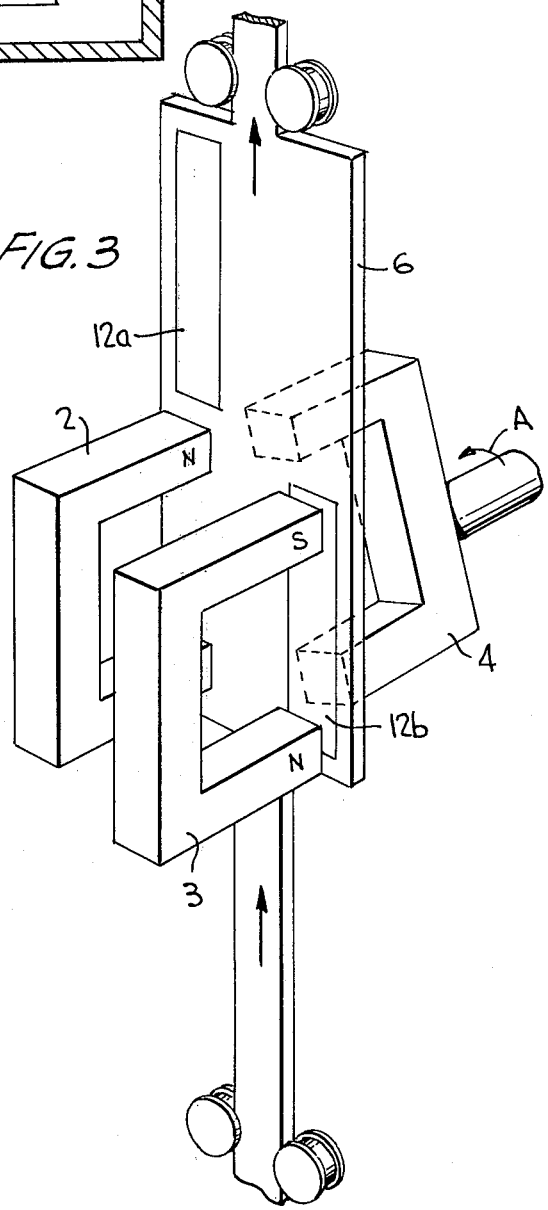
FIG. 3 is a view similar to FIG. 2, with the diverter member being in a second position.

Consequently, as shown in FIGS. 2 and 3, when the movable magnet 4 has its south pole in the top position, the diverted member 6 positions the diverter bar 12a in front of the stationary magnet 2 so as to prevent the stationary magnet 2 from influencing the movable magnet 4. When the diverter member 6 is in this position, only the stationary magnet 3 influences the movable magnet 4. Since the stationary magnet 3 and movable magnet 4 have the same direction of polarity, a repulsion force is created between these magnets, this force causing the rotation of the movable magnet 4 in the direction shown by arrow A. After the movable magnet 4 has been rotated so that the north pole is in the top position, the diverter member 6 is moved into a second position in which the diverter bar 12b diverts the magnet field of the stationary magnet 3 such that only the magnetic field of the stationary magnet 2 influences the movable magnet 4. Since the movable magnet 4 is tilted with respect to the orientation of the stationary magnet 2, the repulsion force which is created between the stationary magnet 2 and the movable magnet 4 causes the movable magnet 4 to continue to rotate in the direction shown by the arrow A.

The diverter member 6 is moved between the two positions, for alternately diverting the magnetic field of the stationary magnets 2 and 3, under the influence of the spring 7 and the solenoid 8. Spring 7 which is attached to arm 6a of the diverter member 6 pulls the diverter member in an upward direction such that the diverter bar 12b is aligned with the stationary magnet 3. As the movable magnet 4 continues to rotate the axial member 9 actuates a switch 10 which in turn is connected to the solenoids for controlling the actuation of the solenoid 8. Upon actuation, solenoid 8, which is connected to arm 6b of the diverter member 6, pulls the diverter member in a downward direction against the force of the spring 7. As rotation of the movable magnet 4 and the axial member 9 continues, solenoid 8 is deactuated and the diverter member 6 in turn is pulled in an upward direction by the spring 7.

The diverter member 6 can be made of any non-ferrous material. The diverter bars 12a and 12b, which are shown inserted within the diverter member 6, however, are made of a ferrous metal material. The diverter bars 12a and 12b will only divert the magnet fields of the stationary magnets 2 and 3 and will not act as effective magnets themselves.

The switch 10 is arranged in such a manner such that when the polarity of the movable magnet 4 is aligned with the magnetic lines of force of the stationary magnets, the solenoid 8 is deactuated so that the spring causes the movement of the diverter member 6. Due to the momentum of the movable magnet 4, as the diverter member 6 is moved into its upward position, as shown in FIG. 3, the movable magnet 4 continues to rotate so that it is now tilted with respect to the stationary magnets. In the same manner, the movable magnet 4 is tilted with respect to the stationary magnets when the diverter bar is finally brought into its downward position, shown in FIG. 2, due to the actuation of the solenoid 8.

Prior to the initial actuation of the drive unit, the diverter member 6 will be in its upward position due to the influence of the spring 7 and hence the movable magnet 4 will have its south polarity on top. When initially actuating this system therefore, the solenoid 8 is actuated so as to pull the diverter member 6 in a downward direction thereby enabling the stationary magnet 3 to influence the movement of the movable magnet 4 and starting the operation of the magnetic motor.

In mounting the stationary magnets and the movable magnets, it becomes desirable to mount these magnets in such a manner so that it is easily possible to detach them and replace them with new magnets due to any subsequent defects or wear in the magnets.

In FIG. 4, a magnetic motor is shown which utilizes a plurality of drive units of the type shown in FIG. 1. As shown in this Figure, a plurality of stationary magnets 2 and 3 are mounted within the housing for each of the drive units. A plurality of movable magnets 4 are mounted on a common axial member 13, with each of the movable magnets being offset by an equal angle with respect to the adjacent movable magnet, such as shown by the illustration in FIG. 5. If eight such movable magnets 4 are provided, the angle by which the magnets are offset with respect to one another would be 22½°. While in the arrangement of a plurality of drive units such as shown in FIG. 4, it is possible to utilize a spring and solenoid for the movement of the diverter member 6 of each of the drive units, it is also possible to move the diverter members through the use of a cam arrangement. Thus, as shown in FIG. 6, a cam member 15 is provided, which cam member is eccentrically mounted on a shaft 14 by the coupling 16. The diverter member 6 is forced in a downward direction by the spring member 7a so as to be in contact with the peripheral surface of the cam member 15. Thus as the cam member 15 rotates about the shaft 14, the diverter member 6 is moved in an up and down direction between the bearings 11. The diverter member has a slot 17 in which a pin 18 which is connected to the housing is inserted, the pin 18 in turn helps guide the movement of the diverter member 6.

An alternative embodiment of a magnetic motor having a plurality of drive units, such as the one shown in FIG. 1, is illustrated in FIGS. 7 and 8. Each of the movable magnets, such as magnets 4a and 4b, has associated with it a corresponding gear, such as gears 20a and 20b. These gears are mounted on the axial members of corresponding movable magnets, such as axial members 9a and 9b. The gears of each of the movable magnets are interconnected in a common drive arrangement, such as shown in FIG. 8 in which eight such drive units are utilized in forming the magnetic motor. The axial member from one of the movable magnets is extended so as to form an output shaft 24 to which a load can be connected. In the operation of this arrangement, it is possible to utilize a single diverter member 21 for all of the drive units, such a diverter member is partially illustrated in FIG. 9. The diverter member 21 is connected between a spring 22 and a solenoid 23, which control the operation of the diverter member 21 in the same manner as described above with respect to the embodiment shown in FIG. 1.

Within the arrangement of the magnetic motor illustrated in FIG. 8, it is also possible to utilize a plurality of separate diverter members. If separate diverter members are utilized, it is possible to supply one member for each vertical set of drive units, i.e. there would be four such members which would in turn be operated in synchronization.

It is noted that the above description and the accompanying drawings are provided merely to present exemplary embodiments of the present invention and that additional modifications of such embodiments are possible within the scope of this invention without deviating from the spirit thereof.

I claim:

1. A magnetic motor having at least one magnetic drive unit, the drive unit comprising: first and second stationary magnets arranged with inverse directions of polarity; a movable magnet mounted for rotation within the magnetic fields of said first and second stationary magnets, said movable magnet being mounted about an axial member so as to enable its direction of polarity to be inversed as said movable magnet rotates; diverter means for alternately diverting the magnetic fields of said first and second stationary magnets for preventing such magnetic fields from influencing said movable magnet so as to enable only said stationary magnet having its direction of polarity in opposition with the polarity of said movable magnet to influence said movable magnet by creating a repulsion force between said magnets and thereby causing the movement of said movable magnet.

2. A magnetic motor as defined in claim 1 wherein said first and second stationary magnets are adjacently arranged and laterally offset with respect to one another.

3. A magnetic motor as defined in claim 2 wherein said first diverter means includes a plate member with separate first and second bars of a first metal material arranged therein and means for reciprocally moving said plate member such that said first and second bars are alternately positioned adjacent to said first and second stationary magnets, respectively, for interrupting the magnetic fields thereof.

4. A magnetic motor as defined in claim 3 wherein said stationary magnets and said movable magnet are horseshoe-shaped magnets and said magnets are arranged such that the open-side of said stationary magnets face the open-side of said movable magnet.

5. A magnetic motor as defined in claim 3 wherein said means for removing said plate member includes a spring coupled to one side of said plate member so as to move said plate member in one direction and solenoid actuated means coupled to the opposite side of said plate member for selectively applying a force for moving said plate member in an opposite direction.

6. A magnetic motor as defined in claim 3 wherein: there are a plurality of said drive units; each plate member of said units has an arm extending from one side thereof; said arms are coupled to a common rotatable shaft; said shaft has a plurality of cams, each coupled to a respective one of said arms, and said shaft and said cams constitute said means for moving said plate member; and said movable magnets are connected to a common said axial member, said movable magnets being mounted on said axial member so as to be offset from one another by equal angles.

7. A magnetic motor as defined in claim 3 wherein: there are a plurality of said drive units, said drive units being aligned along a common plane, said plate members of said units being connected together so as to be moved in synchronism; and further comprising a gear member concentrically mounted on each of said axial members, said gear members being interconnected with one another.

* * * * *